United States Patent [19]

Nordmark

[11] 4,155,567
[45] May 22, 1979

[54] SUPPORT ARRANGEMENTS

[76] Inventor: Mikal Nordmark, 4062 Klepp stasjon, Norway

[21] Appl. No.: 802,925

[22] Filed: Jun. 2, 1977

[30] Foreign Application Priority Data

Jun. 8, 1976 [NO] Norway ............................... 761928

[51] Int. Cl.² ............................................. B60P 7/12
[52] U.S. Cl. ................................................... 280/145
[58] Field of Search ...................... 280/145; 296/3, 14, 296/36

[56] References Cited

U.S. PATENT DOCUMENTS

| 2,275,333 | 3/1942 | Younce | 280/145 |
|---|---|---|---|
| 3,341,221 | 9/1967 | Kane | 280/145 |

FOREIGN PATENT DOCUMENTS 367157  10/1973  Sweden.

Primary Examiner—Philip Goodman
Attorney, Agent, or Firm—Ladas, Parry, Von Gehr, Goldsmith & Dechamps

[57] ABSTRACT

Support arrangement for supporting side frames of a vehicle bounding a loading area thereof. Two L-shaped supports each have a first leg adapted to be upstandingly disposed outside and adjacent one of the side frames. A second leg is for horizontal mounting adjacent the under side of the loading area. A single double acting pressure medium cylinder mutually connects the two L-shaped supports to enable a horizontal displacement of the latter to be brought about towards and away from each other. Two additional double acting pressure medium cylinders each have a piston rod adapted to be pivotably mounted at its outer end adjacent the under side of the loading area. A guide arrangement provides a pivotable mounting for an end of the cylinder remote from the outer end of its piston rod and is connected to and spaced below the horizontal second leg of each of the L-shaped supports. The additional pressure medium cylinders are thus able to effect individual pivoting of the supports about a horizontal axis while allowing unhindered horizontal displacement of the supports with the latter in arbitrary pivotal positions.

1 Claim, 2 Drawing Figures

SUPPORT ARRANGEMENTS

This invention relates to support arrangements for supporting a loading frame on a lorry or similar vehicle or for supporting the load itself, such as lumber, on the vehicle.

There is known, from Norwegian Patent Application No. 1529/73 and its Swedish counter-part 367,157, a support arrangement (load bar) for supporting logs on a vehicle. The support arrangement comprises a first L-shaped support means which is stationarily secured to the vehicle and a second L-shaped support means which is rotatably and axially displaceably secured within the one, horizontal leg of the first L-shaped support means. The double-acting pressure medium cylinder is also secured within the one leg of the first support means. By means of the pressure medium cylinder and an obliquely extending guide groove in the horizontal leg of the first support means and a guide pin in the horizontal leg of the second support means, there can be ensured at the same time as the second support means is axially displaced with a positive movement, a corresponding positive pivoting of the second support means relative to the first support means.

With the present invention the aim is a support arrangement in which the support means on opposite sides of the vehicle can be adjusted into an active use position or into an inactive position as required and independently of each other.

A further aim of the present invention is to be able to effect the axial displacement of the support means independently of the rotation, and vice versa. If desired, the axial displacement and the rotation can be effected simultaneously, should there be a real need for this. A further objective is to be able to pivot and axially displace the support means individually or simultaneously should this really be desirable. As a result, one is able to release the loading frame in an arbitrarily desired manner on unloading a vehicle or is able to make ready the loading frame in an arbitrarily desired manner after the vehicle is finally loaded.

According to the present invention a support arrangement for supporting a loading frame on a lorry or similar vehicle or for supporting a load itself on said vehicle comprises two L-shaped support means arranged one on each side of the vehicle, a single double acting pressure medium cylinder mutually connecting said two L-shaped support means to enable the latter to be horizontally displaced towards and away from each other, two additional double acting pressure medium cylinders for pivoting said support means about a horizontal axis, each support means having a horizontal leg and being individually pivotable by its respective one of said additional cylinders which acts on said leg from a location spaced from said horizontal axis and guide means disposed between said support means and said additional cylinder allowing unhindered horizontal displacement of said support means while the latter is in an arbitrary pivotal position.

In an arrangement for supporting side frames of a vehicle bounding a loading area thereof, the two L-shaped supports each having a first leg adapted to be upstandingly disposed outside and adjacent a respective one of the side frames and a second leg for horizontal mounting adjacent the under side of said loading area, a single double acting pressure medium cylinder mutually connecting said two L-shaped support means to bring about a horizontal displacement of the latter towards and away from each other, two additional double acting pressure medium cylinders each having a piston rod adapted to be pivotably mounted at its outer end adjacent the under side of said loading area and guide means providing a pivotable mounting for an end of said cylinder remote from said outer end of its piston rod, said guide means being connected to and spaced below said horizontal second leg of a respective one of said L-shaped support means enabling said additional pressure medium cylinders to effect individual pivoting of the support means about a horizontal axis while allowing unhindered horizontal displacement of said support means while the latter are in arbitrary pivotal positions.

In order that the invention can be more clearly understood, a convenient embodiment thereof will now be described, by way of example, with reference to the accompanying drawings in which.

Figure 1:
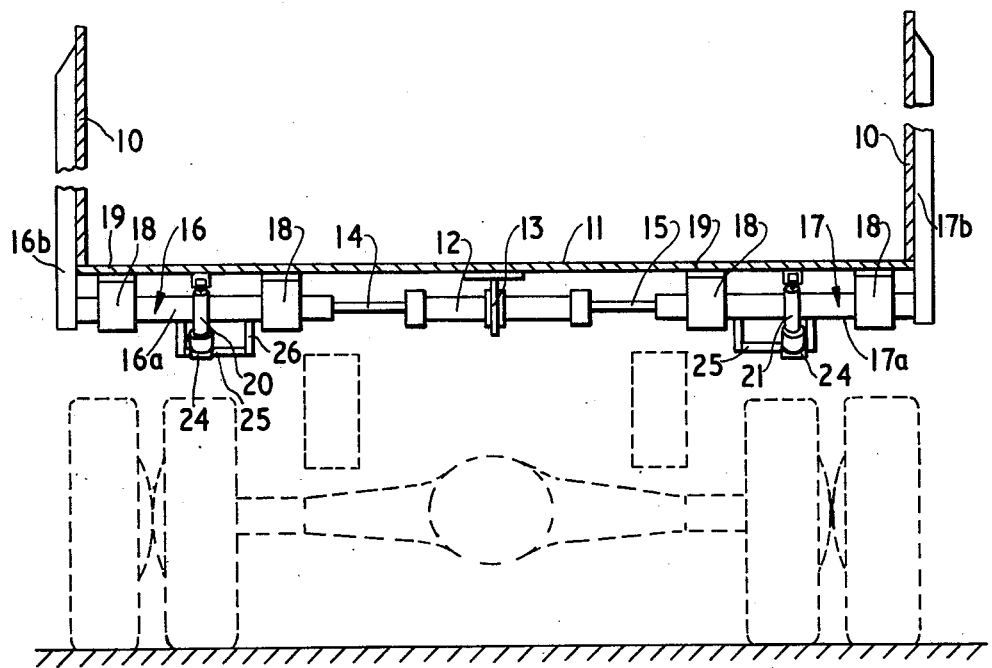
FIG. 1 is a side view of a support arrangement.
Figure 2:
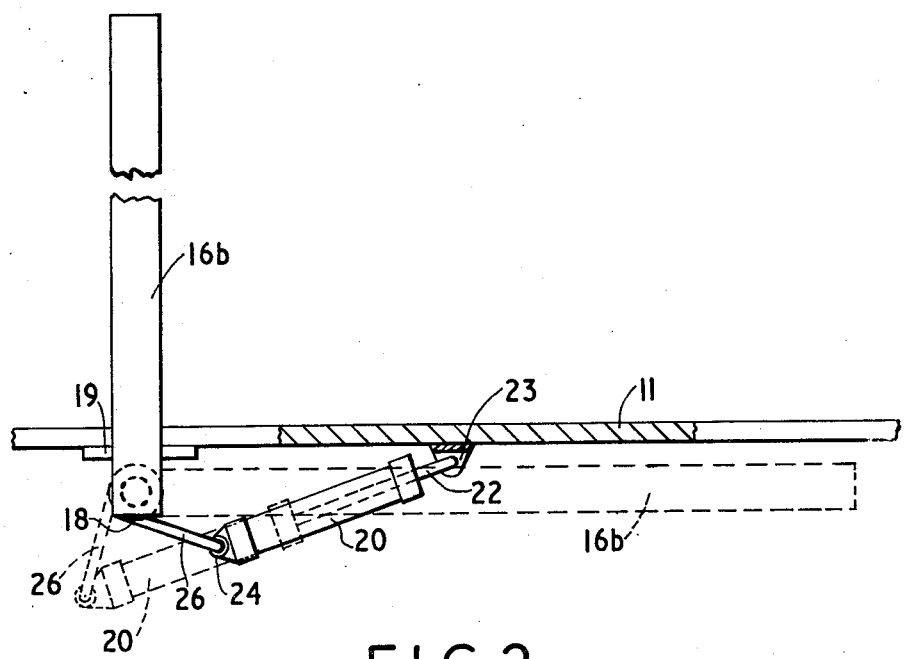
FIG. 2 is an end view of the support arrangement of FIG. 1 and shows in full lines that arrangement in a supporting position and in dotted lines in an inactive position.

Referring to FIGS. 1 and 2, there are illustrated two side frames 10 on the sides of a loading area 11 of a vehicle. To the under side of the loading area 11, there is centrally secured a first double acting pressure medium cylinder 12 by a fastening bracket 13. The pressure medium cylinder extends horizontally and transversely of the longitudinal direction of the vehicle. The pressure medium cylinder is provided with two separate, oppositely working pistons. From the pressure medium cylinder there projects endways outwards in opposite directions two associated piston rods 14 and 15 which at the one end are connected to their respective associated piston (not shown) and at the opposite end are secured to their respective end of an associated L-shaped support 16, 17. The supports have a first horizontal portion 16a, 17a extending axially displaceably and pivotably mounted in associated support sleeves 18 which are secured to the under side of the loading area via fastening plates 19 and have a second pivotable support portion 16b, 17b extending outside the side of the loading area.

By means of the illustrated pressure medium cylinder 12 the supports 16, 17 can be moved axially towards and away from each other so as to draw the support portions 16b, 17b tightly up to the side edges of the loading area and to displace the support portions away from the side edges of the loading area so as to facilitate the pivoting of the support portion relative to the loading area and the associated side edge.

By means of two further pressure medium cylinders 20, 21, it is possible to effect pivoting of the supports 16, 17 individually about a horizontal axis. The piston rod 22 of the pressure medium cylinder is pivotably mounted at the outer end in a bracket 23 secured to the under side of the loading area, while the cylinder itself is pivotably mounted via a support sleeve 24 which is pivotably mounted on a guide rod 25 which is axially displaceably received in the support sleeve 24. The guide rod 25 is secured at the outer ends of two parallel arms 26 which are secured to a horizontal portion of the support means between associated support sleeves 18.

The pressure medium cylinders 12, 20, 21 can be actuated separately or at the same time should there be a real need for this, since the guide rod 25 can slide unhindered in the support sleeve 24 on the associated pressure medium cylinder 20, 21 during actuation of the cylinder 12 into arbitrary pivotal positions of the supports, while the support sleeve 24 can be turned about the guide rod 25 during pivoting of the supports into arbitrary pushed-on positions.

It is also possible to utilise the support arrangement according to the invention for direct support of the load, such as timber and the like, without the use of loading frames, the pressure medium cylinders being able in such a case to be secured directly to the frame of the vehicle instead of to the loading area as shown.

There can be employed for each vehicle two or more parallel support arrangements constructed correspondingly as illustrated and positioned at a suitable mutual distance in the longitudinal direction of the vehicle. If desired, there can be employed a common pressure medium cylinder 20 for pivoting supports on one side of the vehicle and a corresponding common pressure medium cylinder 21 on the opposite side of the vehicle, arms 26 of the supports in the different support arrangements being able to be connected to each other via common push rods (not shown). Correspondingly, pressure medium cylinders 12 of the support arrangements can be coupled in parallel to a common control conduit, so that combined support arrangements can be actuated simultaneously and equally with respect to the horizontal displacement of the supports in relation to the vehicle. The said pressure medium cylinders 12, 20, 21 can be supplied with pressure medium from a common pressure medium source. In practice, hydraulic pressure medium is preferred, but pneumatic pressure medium can also be considered. Necessary control conduits and control means are not shown in the drawing, but standard components can be employed which are in normal use.

What I claim is:

1. In a truck having a platform with power-operated movable lateral supports on either side of the loading platform for retaining timber and similar loads, wherein the improvement comprises two L-shaped supports each having a first leg adapted to be upstandingly disposed outside and adjacent the side of the loading platform and a second leg for horizontal mounting on the underside of said loading platform, a single double-acting pressure medium cylinder mounted on the underside of said platform, two separate oppositely working pistons mutually connecting said two L-shaped supports and adapted to horizontally displace said L-shaped supports towards and away from each other transversely to the vehicle axis, two additional pressure medium cylinders located on the underside of said platform each having a piston rod pivotably mounted at its free end on the underside of said loading platform, guide means on said second legs of said L-shaped supports providing a pivotable mounting for the other end of said cylinder remote from said piston rod, the arrangement being such that on actuation of said additional cylinders the L-shaped supports may be individually pivoted about a horizontal axis while allowing unhindered horizontal displacement of said L-shaped supports transversely to the vehicle axis irrespective of its pivotal positions.

* * * * *